(12) United States Patent
De Jong et al.

(10) Patent No.: US 7,794,905 B2
(45) Date of Patent: Sep. 14, 2010

(54) PHOTORECEPTOR DEVICE HAVING A SELF-ASSEMBLED PATTERNED BINDER LAYER

(75) Inventors: Kathy L. De Jong, Mississauga (CA); Hany Aziz, Oakville (CA)

(73) Assignee: Xerox Corporation, Norwalk, CT (US)

( * ) Notice: Subject to any disclaimer, the term of this patent is extended or adjusted under 35 U.S.C. 154(b) by 836 days.

(21) Appl. No.: 11/690,416

(22) Filed: Mar. 23, 2007

(65) Prior Publication Data
US 2008/0233500 A1 Sep. 25, 2008

(51) Int. Cl.
*G03G 5/00* (2006.01)
(52) U.S. Cl. .................. 430/57.2; 430/58.05; 430/59.5; 430/70; 430/76; 430/96
(58) Field of Classification Search ................ 430/57.2, 430/58.05, 59.5, 70, 76, 96
See application file for complete search history.

(56) References Cited

U.S. PATENT DOCUMENTS

| 4,286,033 | A | 8/1981 | Neyhart et al. |
| 4,291,110 | A | 9/1981 | Lee |
| 4,338,387 | A | 7/1982 | Hewitt |
| 4,654,294 | A | 3/1987 | Sato et al. |
| 5,293,209 | A | 3/1994 | Soga et al. |
| 7,635,548 | B2 * | 12/2009 | Bender ..................... 430/59.1 |

FOREIGN PATENT DOCUMENTS

| JP | 09-292731 A | 11/1997 |
| JP | 10-063025 A | 3/1998 |
| JP | 2005-189880 | 7/2005 |

OTHER PUBLICATIONS

Stenzel et al., "Formation of Honeycomb-Structured, Porous Films via Breath Figures with Different Polymer Architectures," *Journal of Polymer Science Part A: Polymer Chemistry*, 44, 2363 (2006).
Cui et al., "Polymer Surfaces with Reversible Switchable Ordered Morphology," *Langmuir* 21, 11696 (2005).
Li et al., "Block Copolymer Patterns and Templates," *Materials Today*, vol. 9, No. 9, pp. 30-39, Sep. 2006.
Ratnayani et al., "Novel Membranes with Honeycomb Structure Based on Star Polystyrenes," pp. 1-6, 2006.
Krishnamoonhy et al., "Nanoscale Patterning with Block Copolymers," *Materials Today* vol. 9, No. 9, pp. 40-47, Sep. 2006.
Stoykovich et al., "Block Copolymers and Conventional Lithography," *Materials Today*, vol. 9, No. 9, pp. 20-29, Sep. 2006.
Bormashenko et al., "Self-Assembled Honeycomb Polycarbonate Films Deposited on Polymer Piezoelectric Substrates and Their Applications," *Polymers for Advanced Technologies*, vol. 16, pp. 299-304, Feb. 17, 2005.
Cui et at., "Ordered Porous Polymer Films Via Phase Separation in Humidity Environment," *Polymer*, 46, 5334 (2005).
Kesting, in Synthetic Polymeric Membranes, McGraw-Hill, New York, 1995.
Filed on Mar. 23, 2007 in the name of De Jong et al.

* cited by examiner

*Primary Examiner*—Mark A Chapman
(74) *Attorney, Agent, or Firm*—Oliff & Berridge, PLC

(57) ABSTRACT

A photoreceptor device having at least one layer that is a self-assembled patterned binder layer, which may include at least one functional material.

27 Claims, No Drawings

PHOTORECEPTOR DEVICE HAVING A SELF-ASSEMBLED PATTERNED BINDER LAYER

BACKGROUND

Photosensitive members such as electrophotographic or photoconductive imaging members, including photoreceptors or photoconductors, typically include a photoconductive layer formed on an electrically conductive substrate or formed on layers between the substrate and photoconductive layer. The photoconductive layer is an insulator in the dark, so that electric charges are retained on its surface. Upon exposure to light, the charge is dissipated, and an image can be formed thereon, developed using a developer material, transferred to a copy substrate, and fused thereto to form a copy or print.

Known organic photoreceptors use polymer binders as a holding media for functional material. Such functional material may include charge generating material and/or charge transport material. In such known photoreceptors, theses binders are formed of molecules in a highly disordered state, and the functional material is molecularly dispersed. Currently, the poor compatibility between functional materials and known binder matrices may lead to crystallization and the formation of charge trap sites. Due to this poor compatibility, where the functional materials and the binder material contact, charges may get trapped instead of passing through the layers of the photoreceptor.

Thus, it is still desired to produce photoreceptors having a controlled and ordered morphology such that incompatible functional materials and binder materials do not contact each other in a manner that creates charge trap sites.

SUMMARY

In embodiments, disclosed herein is a photoreceptor device, comprising a substrate, and at least one patterned binder layer comprising a solid binder matrix and hollow spaces filled with a functional material or a filler, wherein the solid binder matrix comprises a self-assembled binder material.

In further embodiments, disclosed herein is a photoreceptor device, comprising a substrate, and at least one of a charge generation layer, a charge transport layer, and an overcoat layer, wherein any of the at least one of the charge generation layer, the charge transport layer, and the overcoat layer is a self-assembled patterned binder layer.

In yet further embodiments, disclosed herein is a photoreceptor device, comprising a substrate, and at least one of a charge generation layer, a charge transport layer, and an overcoat layer, wherein the charge transport layer is a self-assembled binder layer having charge transport functional material, and wherein the charge transport functional material is inside hollow spaces of the self-assembled patterned binder layer or within a solid binder matrix of the self-assembled patterned binder layer.

EMBODIMENTS

The present disclosure relates generally to photoconductive imaging members such as photoconductors, photoreceptors and the like, for example which may be used in electrophotographic or xerographic imaging processes.

The photoconductive imaging members are, in embodiments, multilayered photoreceptors that comprise a substrate, an optional conductive layer, an optional undercoat layer, an optional adhesive layer, a charge generating layer, a charge transport layer, and an optional overcoat layer. At least one of the layers of the multilayered photoreceptors includes a self-assembled patterned binder as holding media for functional materials.

The patterned binder disclosed herein may be formed by means of any molecular self-assembly process. The self-assembled patterned binder may be used as the binder in any layer of the photoreceptor layers. For example, the self-assembled patterned binder layer may be used as the binder layer in one or more, or even all, of the layers in a photoreceptor device, such as, for example, in (i) a charge generation and transport layer, (ii) a charge generation layer, (iii) a charge transport layer, (iv) an overcoat layer or (v) an undercoat layer.

A self-assembled binder layer having about a nano to about a micron scale patterned morphology (in other words, the size of the pores or hollow spaces in the patterned morphology will have about a nano to about a micron scale) may provide several advantages. Binder materials which self-assemble to produce a binder layer having a patterned morphology may confine a functional material, that is, a charge generating material, a charge transport material, etc., depending upon which layer of the photoreceptor includes the self-assembled patterned binder layer to a particular location and spatial arrangement.

In embodiments, a binder which self-assembles to form dispersed spaces will (1) allow confinement of functional materials, such as charge transport materials and charge generating materials, to discrete locations evenly dispersed throughout the device, (2) promote molecular assembly of functional materials within these spaces, and (3) result in improved mobility of the charges within the photoreceptor layers.

In further embodiments, self-assembled binders may organize functional materials to create more interfaces between, for example, charge generation materials and charge transport materials. This may maximize charge generation efficiency. The type of binder materials selected and the physical arrangement of the binder material, such as in a honeycomb pattern, may also improve the mechanical properties of any layer having the self-assembled binder materials forming the layer within the photoreceptor device.

In general, the binder material disclosed herein may be self-assembled to form a patterned binder layer of any shape, such as a solid binder matrix with uniform hollow spaces (for example, pores, holes, spheres, ridges, channels, etc.), or a solid binder matrix with uniform protruding geometries (for example, ridges, columns, etc.) Of course, many other patterns may also be possible.

As described above, the self-assembled binder layer may have hollow spaces, such as holes, spheres, ridges, channels and columns. For purposes herein, the hollow spaces will be universally referred to as "pores." If the pores are circular or spherical in nature, then they may have a diameter of from about 1 nm to about 100 μm, such as a diameter from about 10 nm to about 50 μm or from about 100 nm to about 10 μm.

The patterned binder layer may have any kind of symmetry, that is, one dimensional, two dimensional or three dimensional symmetry, in any direction such as parallel to the layer, perpendicular to the layer, etc. Although the pattern periodicity may be of any size possible by formation of molecular self-assembly, the periodicity of the patterned binder layer may be less than about 500 μm, parallel to a substrate, in the interest of increased image resolution. In embodiments, the pattern periodicity may be from about 50 nm to about 500 μm, such as from about 100 nm to about 200 μm or from about 500 nm to about 100 µm. As used herein, "pattern periodicity" refers to the distance between each repeating pattern in the self-assembled patterned binder layer disclosed herein.

The binder material suitable for forming the self-assembled patterned binder layer disclosed herein may be comprised of any polymeric, oligomeric or small-molecule organic material. Suitable examples of such binder materials include polycarbonates and polystyrenes.

In embodiments, self-assembled patterned binder layers may produce a patterned film such that different functional materials may be confined to a particular location and in a particular spatial arrangement. For example, a binder which self-assembles to form dispersed spaces may allow confinement of charge transport molecules to discrete locations evenly dispersed throughout the photoreceptor device, promote molecular assembly of the functional material within these spaces, and ultimately result in a faster discharge.

In further embodiments, the self-assembled patterned binder layers may direct functional materials to discrete locations and serve as scaffolds or templates for molecular arrangements in order to create more interfaces between various functional materials, such as charge generation materials and charge transport materials, within the same layer. Decreasing the spatial proximity between various functional materials, such as at a site between charge generation materials and charge transport materials and also increasing the number of surfaces where charge generation and charge transfer may occur, results in maximal charge generation efficiency and provides a method for a single layer photoreceptor design.

The size of a polymer binder, such as a molecular weight (Mw) of from about 2,000 to about 600,000, and the physical arrangement or patterning of the material, such as a honeycomb pattern, may improve the mechanical properties of any layer within the device.

In embodiments, a porous film is created by using a self-assembling binder material. The pores formed in the layer of the binder material may be filled with a solution containing a functional material, such as a charge transport material or a charge generation material, which may remain in an unordered state. Although the functional material may be in an unordered state, it would still be confined to the pore volume of the patterned binder layer. In alternative embodiments, the functional material may be assembled to form an ordered structure within the pores. Such an approach may be advantageous when functional materials with little solubility are required, such as pentacene, tetracene and anthracene, or their derivatives, or functional materials which exhibit high mobility when self-assembled such as liquid crystals. In yet further embodiments, the functional material may be crosslinked within the pores.

In further embodiments, the functional material may be coated onto a formed self-assembled patterned binder layer. Prior to coating the formed binder layer, the functional material may be dispersed in any suitable polymer to provide a suitable coating of the functional material onto the self-assembled patterned binder layer. Thus, the functional material may coat the pores of the binder layer such that another functional material may be used to fill the pores of the self-assembled patterned binder layer, or the functional material may fill in the entire volume of the pores of the self-assembled patterned binder layer.

In yet further embodiments, the self-assembled binder layer may be prepared by including a functional material in the binder material prior to formation of the self-assembled binder layer. In such embodiments, the functional material is introduced into the binder as a single formulation prior to formation of the self-assembled patterned binder layer. Through the self-assembly process of the binder material, the functional material may be evenly dispersed in the formed binder layer or the functional material may be located in discrete locations of the binder layer, such as lining the pores of the self-assembled patterned binder layer. For example, the functional material within the binder layer may be located at the outside edges of the binder layer such that the functional material comes into contact with the material inside the pores, such as a second functional material or a filler material, used to fill the pores of the self-assembled patterned binder layer.

The binder self-assembly is used to create a template or scaffold to induce other organized morphologies of different functional materials. In embodiments, an additional solution containing functional materials, such as charge generation materials, charge transport materials, carbon nanotubes, etc., may be passed over the template creating another layer with self-assembled functional material directed by the template of the first formed self-assembled patterned binder layer.

The functional material may be any charge generation material suitable for use in a charge generation layer as described herein, and may be any charge transport material suitable for use in a charge transport layer as described herein.

The charge generation materials suitable for the described functional materials may include quinacridones, dibromo anthanthrone pigments, perylene diamines, perinone diamines, polynuclear aromatic quinones, azo pigments, oxyvanadium phthalocyanine, chloroaluminum phthalocyanine, copper phthalocyanine, oxytitanium phthalocyanine, chlorogallium phthalocyanine, hydroxygallium phthalocyanine, magnesium phthalocyanine, metal-free phthalocyanine, and mixtures thereof.

The charge transport material suitable for the described functional material may be a tertiary aromatic amine, such as N,N'-diphenyl-N,N'-bis(3-hydroxyphenyl)-1,1'-biphenyl-4, 4'-diamine, N,N'-diphenyl-N,N'-bis(3-methylphenyl)-1,1'-biphenyl-4,4'-diamine, N,N,N'N'-tetra(4-methylphenyl)-(1, 1'-biphenyl)-4,4'-diamine, 4,4'-(3,4-dimethylphenylazanediyl)bis(4,1-phenylene)dimethanol, N,N'-bis(3-methylphenyl)-N,N'-bis(4-n-butylphenyl)-1,1'-terphenyl-4,4-diamine, and mixtures thereof.

Examples of a processes that may lead to a self-assembled porous binder matrix involve utilizing a polymer, a solvent, and a non-solvent. One of ordinary skill may refer to such a method as the "breath figure" method. Suitable polymers for forming binder layers according to the "breath figure" method may include any polymers that form star-like micelles, for example linear polymers such as monocarboxy terminated polystyrene, dicarboxy terminated polystyrene, polyamide, and mixtures thereof; and branched polymers, any block copolymer, for example including block copolymers with at least one material (block) being a polystyrene, a poly(paraphenylene) or a polyimide, such as a material selected from polystyrene, polyparaphenylene, poly2-vinylpyridine, poly(n-alkylmethacrylate), poly(n-butylmethacrylate), poly(methyl methacrylate), poly(2-vinylpyridine), polyisoprene, poly(ferrocenyldimethylsilane), poly(cyclohaylethylene), polylactide, poly(ferrocenyldimethylsilane), poly(dimethysiloxane), poly(ethylene-propylene), polyethylene, polybutadiene, poly(ethyleneoxide), polystyrenepolybutadiene, poly(α-methylstyrene), poly(4-hydroxystyrene), poly(methyltetraclododecene), poly(substituted-2-norbornene), poly(propyleneoxide), poly(butadienevinylpyridinium), poly(tert-butylacrylate), poly(cinnamoyl-ethylmethacrylate), pentadecyl phenol modified polystyrene, poly(4-vinylpyridine) and poly(tert-butylmethacrylate). Specific examples of block copolymers include polystyrene-polyparaphenylene block copolymers, polystyrene/poly2-vinylpyridine, and the block copolymers selected from polystyrene/poly(n-alkylmethacrylate), polystyrene/poly(n-butylmethacrylate), polystyrene/poly(methyl methacrylate), polystyrene/poly(2-vinylpyridine), polystyrene/polyisoprene polystyrene/poly(ferrocenyldimethylsilane), poly(cyclohaylethylene)/polylactide, poly(ferrocenyldimethylsilane)/poly(dimethysiloxane), polystyrene/poly(ethylene-propylene), polyestyrene/polyethylene, polybutadiene/poly(ethyleneoxide), polystyrene/polybutadiene, polystyrene/poly(ethyleneoxide), polystyrenepolybutadiene/polystyrene, poly($\alpha$-methylstyrene)/poly(4-hydroxystyrene), polyisoprene/poly(ferrocenyldimethylsilane), polystyrene/polyisoprene/polystyrene, polystyrene/poly(tert-butylacrylate), poly(methyltetraclododecene)/poly(substituted-2-norbornene), polyisoprene/poly(ethyleneoxide), polystyrene/polylactide, poly(ethyleneoxide)/poly(propyleneoxide)/poly(ethyleneoxide), polybutadiene/poly(butadienevinylpyridinium), poly(tert-butylacrylate)/poly(cinnamoyl-ethylmethacrylate), pentadecyl phenol modified polystyrene/poly(4-vinylpyridine), polystyrene/poly(2-vinylpyridine)/poly(tert-butylmethacrylate), polystyrene/poly(paraphenylene), and combinations thereof.

The linear and branched amorphous polyester resins suitable for use herein, in embodiments possess, for example, a number average molecular weight (Mn), as measured by GPC, of from about 10,000 to about 500,000, and preferably from about 5,000 to about 250,000; a weight average molecular weight (Mw) of, for example, from about 2,000 to about 600,000, and preferably from about 7,000 to about 300,000, as determined by GPC using polystyrene standards; and a molecular weight distribution (Mw/Mn) of, for example, from about 1 to about 6, and more specifically, from about 2 to about 4.

As used herein, micelles refer to small, spherical structures composed of molecules that attract one another to reduce surface tension, and a linear polymer refers to any polymer that forms long chains without a cross-linked structure and without having any smaller chains attached to the polymer backbone. Common solvents suitable for use in this method may include carbon disulfide, tetrahydrofuran (THF), chloroform, toluene, benzene, hexane, xylene, ethylbenzene, methylene chloride, carbon tetrachloride, dichloroethane, dichloromethane, and mixtures thereof. An example of a suitable non-solvent may be water, phenol, ether, methanol, ethanol, propanol, and butane. One of ordinary skill understands that this process is not limited only to these polymer/solvent/non-solvent combinations, but may be readily utilized with any combination of polymer/solvent/non-solvent that will produce suitable results.

To prepare binder layers by the "breath figure" method, polymer/solvent solutions may be spread onto a flat support and rapidly evaporated by a flow of humid air. The flat support may be in an environment having a non-solvent, for example, a humid environment, such as an enclosed humid chamber, and an inert gas, such as air, xenon, argon, nitrogen, oxygen, etc., is optionally passed over the flat support having the polymer/solvent solution thereon. Use of an inert gas is not necessary if the boiling point of the solvent is such that it will evaporate without the use of an inert gas.

Evaporation of the solvent, and the subsequent cooling of the solution surface induces non-solvent vapor condensation, such as water vapor condensation, in droplets at the air/solution interface with the majority of the non-solvent droplets located below the air/solution interface. Precipitation of the polymer at the solution/non-solvent interface may form a solid polymer layer surrounding the non-solvent droplet preventing coalescence with other non-solvent droplets. Such an encapsulation may allow locally arranged droplets to form stable compact hexagonal geometries producing films with a "honeycomb" appearance.

Following the solvent evaporation, due to the majority of the non-solvent droplet being below the surface, water evaporation bursts the polymer layer on top of the droplets and may thus generate the pores.

In an alternative embodiment, the flat support having the polymer/solvent solution thereon is placed in an open environment, and an inert gas saturated by water is passed over the flat support to produce the pores in the same manner as described above. In this embodiment, the polymer/solvent solution and inert gas may be the same as those described above.

Pore diameters, intervals between adjacent holes, and pore shape, such as spheres, tubes and disordered spaces, may be controlled. The pore diameters, intervals and shape may be controlled by the relative humidity, airflow, concentration of the polymer, polymer structure (branched or linear), and molecular weight of the polymer. See, for example, Stenzel et al., Journal of Polymer Science Part A: Polymer Chemistry 44, 2363 (2006); Cui et al., Langmuir 21, 11696 (2005); Kesting, in Sythetic Polymeric Membranes, McGraw-Hill, N.Y., 1995, each of which are incorporated herein by reference in their entireties.

In embodiments, the polymer/solvent solution is between 5° C. and 60° C., such as from about 20° C. to about 30° C. The flow rate of the humid air, that is, the water saturated air, may have a flow rate of from about 50 mm/s to 1 m/s, such as a flow rate of from about 500 mm/s to about 500 cm/s. As used herein, humid air or water saturated air refers to air having a humidity level of from about 50 percent to about 100 percent humidity, such as from about 60 percent to about 95 percent or from about 65 percent to about 90 percent humidity.

Utilizing self-assembled binders in photoreceptor devices allows incorporation of a variety functional materials in a variety of arrangements and locations. For example, a porous film formed using a selected polymer or polymer blend may be prepared by the procedure described above. The open spaces can be filled with charge transport molecules after formation of the self-assembled patterned binder layer. The charge transport material may remain in an unordered state, yet confined to the pore volume, or may assemble to form a more ordered structure within the pore increasing mobility through the device.

In embodiments, if the functional material is immiscible with the polymer, phase separation may occur when the polymer concentration reaches a critical value during solvent evaporation, that is when the concentration of the polymer in the solvent is above the solubility constant for the polymer, the immiscible functional material will precipitate from the system due to the reduced solubility in the solvent. When the vapor of the solution reaches the dew point, or reaches a temperature at which the vapor condenses, these domains are reorganized around the non-solvent, that is, water, droplet template. As the droplet sinks into the solution due to the added weight, holes are formed containing the immiscible material in a hexagonal array which corresponds to the lowest free energy arrangement. After complete evaporation, a porous film with holes containing the immiscible material remains. These holes, if desired, may be filled with additional material. Using such a procedure, one functional material may be incorporated into the pore walls and the pore may be filled with a second functional material resulting in more surfaces and better transfer between the two functional materials. In embodiments, the two functional materials are a charge transport material and a charge generation material.

Polymer length and polymer branch length may be adjusted to produce desired pore size, pore wall thickness, and regularity to match the desired mechanical properties of the photoreceptor. Thus, a self-assembled patterned binder layer may be used in any layer of a photoreceptor device, such as in an undercoat layer, a charge generation layer, a charge transport layer, a charge generation and charge transport layer, and an overcoat layer, to induce the desired mechanical properties.

In embodiments, the self-assembled patterned binder layer may be formed by depositing a block copolymer to form a self-assembled non-patterned layer. A solvent is then applied to the block copolymer layer to dissolve one of the polymers in the self-assembled non-patterned layer to form the patterns. In dissolving one of the polymers of the block copolymer, a self-assembled patterned binder layer is formed.

Examples of suitable block copolymers, for use herein, include all of the block copolymers set forth above.

Examples of solvents that may dissolve one polymer of the above described block copolymers include carbon disulfide, tetrahydrofuran (THF), chloroform, toluene, benzene, hexanes, xylene, ethylbenzene, methylene chloride, carbon tetrachloride, and dichloroethane.

In embodiments, the binder material prior to formation of the self-assembled patterned binder layer may include at least one functional material in amounts of about 10 weight percent to about 95 weight percent of the binder material, such as from about 15 weight percent to about 85 weight percent or from about 25 weight percent to about 75 weight percent of the binder material. Upon formation of the self-assembled patterned binder layer, the formed binder layer may include at least one functional material in amounts of from about 25 weight percent to about 95 weight percent of the formed binder layer, such as from about 30 weight percent to about 90 weight percent or from about 40 weight percent to about 85 weight percent of the self-assembled patterned binder layer. The amount of functional material in the formed self-assembled patterned binder layer includes any functional material that may be located within the binder portion of the binder layer and any functional material located within the pores of the self-assembled patterned binder layer.

In yet further embodiments, the self-assembled patterned binder layer may be formed by dipping the substrate into a solution and quickly removing the substrate from the solution. A solution suitable for use in this embodiment includes the polymer/solvent solutions described above. "Quickly removing" the substrate from the solution refers to a pulling speed of from about 20 cm/min. to about 60 cm/min., such as from about 25 cm/min. to about 55 cm/min. or from about 35 cm/min. to about 50 cm/min. The film formed from the polymer/solvent solution is immediately dried by air or another inert gas under isothermal conditions. The temperature of drying may be any suitable temperature, such as from about 15° C. to about 600° C. or from about 20° C. to about 470° C. Once dried, the film will form a patterned structure, such as a honeycomb structure. It is believed that the film will form a patterned structure because the molecules of the film will organize themselves in the lowest energy arrangement possible.

Illustrative examples of substrate layers selected for the photoconductive imaging members, and which substrates may be known substrates and which can be opaque or substantially transparent, comprise a layer of insulating material including inorganic or organic polymeric materials, such as MYLAR®, a commercially available polymer, MYLAR® containing titanium, a layer of an organic or inorganic material having a semiconductive surface layer, such as indium tin oxide, or aluminum arranged thereon, or a conductive material inclusive of aluminum, chromium, nickel, brass or the like. The substrate may be flexible, seamless, or rigid, and may have a number of many different configurations, such as for example, a plate, a cylindrical drum, a scroll, an endless flexible belt, and the like. In one embodiment, the substrate is in the form of a seamless flexible belt. In some situations, it may be desirable, particularly when the substrate is a flexible organic polymeric material, to coat on back of the substrate with an anticurl layer, such as for example polycarbonate materials commercially available as MAKROLON®.

The thickness of the substrate layer depends on a number of factors, including the characteristics desired and economical considerations, thus this layer may be of substantial thickness, for example over 3,000 microns, such as from about 3,000 to about 7,000 microns or of minimum thickness, such as at least about 50 microns, providing there are no significant adverse effects on the member. In embodiments, the thickness of this layer is from about 75 microns to about 300 microns.

If a conductive layer is used, it is positioned over the substrate. The term "over" as used herein in connection with many different types of layers, as well as the term "under," should be understood as not being limited to instances where the specified layers are contiguous. Rather, the term refers to relative placement of the layers and encompasses the inclusion of unspecified intermediate layers between the specified layers.

Suitable materials for the conductive layer include aluminum, zirconium, niobium, tantalum, vanadium, hafnium, titanium, nickel, stainless steel, chromium, tungsten, molybdenum, copper, and the like, and mixtures and alloys thereof.

The thickness of the conductive layer is, in one embodiment, from about 20 angstroms to about 750 angstroms, and, in another from about 50 angstroms to about 200 angstroms, for a suitable combination of electrical conductivity, flexibility, and light transmission. However, the conductive layer can, if desired, be opaque.

The conductive layer can be applied by known coating techniques, such as solution coating, vapor deposition, vacuum deposition and sputtering. Other suitable methods can also be used. In embodiments, the conductive layer may be a self-assembled patterned binder layer as disclosed herein.

If an undercoat layer is employed, it may be positioned over the substrate, but under the charge generation layer. The undercoat layer is at times referred to as a hole-blocking layer in the art.

Suitable undercoat layers for use herein include polymers, such as polyvinyl butyral, epoxy resins, polyesters, polysiloxanes, polyamides, polyurethanes, and the like, nitrogen-containing siloxanes or nitrogen-containing titanium compounds, such as trimethoxysilyl propyl ethylene diamine, N-beta (aminoethyl) gamma-aminopropyl trimethoxy silane, isopropyl 4-aminobenzene sulfonyl titanate, di(dodecylbenezene sulfonyl)titanate, isopropyl di(4-aminobenzoyl)isostearoyl titanate, isopropyl tri(N-ethyl amino)titanate, isopropyl trianthranil titanate, isopropyl tri(N,N-dimethyl-ethyl amino)titanate, titanium-4-amino benzene sulfonate oxyacetate, titanium 4-aminobenzoate isostearate oxyacetate, gamma-aminobutyl methyl dimethoxy silane, gamma-aminopropyl methyl dimethoxy silane, and gamma-aminopropyl trimethoxy silane, as disclosed in U.S. Pat. Nos. 4,338,387, 4,286,033 and 4,291,110.

The undercoat layer may be applied as a coating by any suitable conventional technique such as spraying, die coating, dip coating, draw bar coating, gravure coating, silk screening, air knife coating, reverse roll coating, vacuum deposition, chemical treatment and the like. In embodiments, the undercoat layer may be the self-assembled patterned binder layer disclosed herein.

In fabricating a photoconductive imaging member, a charge generation layer may be deposited and a charge transport layer may be deposited onto the substrate surface either in a laminate type configuration where the charge generation layer and charge transport layer may be in different self-assembled patterned binder layers or in a single layer configuration where the charge generation layer and charge transport layer may be in the same self-assembled binder layer disclosed herein. In embodiments, the charge generation layer may be applied prior to the charge transport layer.

The charge generation layer may be positioned over the undercoat layer. If an undercoat layer is not used, the charge generation layer may be positioned over the substrate. In embodiments, the charge generation layer may include charge generation materials, such as selenium and alloys of selenium and arsenic, tellurium, germanium and the like, hydrogenated amorphous silicon and compounds of silicon and germanium, carbon, oxygen, nitrogen and the like fabricated by vacuum evaporation or deposition. The charge generation layers may also comprise inorganic pigments of crystalline selenium and its alloys; Group II-VI compounds; and organic pigments such as quinacridones, polycyclic pigments such as dibromo anthanthrone pigments, perylene and perinone diamines, polynuclear aromatic quinones, azo pigments including bis-, tris- and tetrakis-azos, and the like.

Phthalocyanines have been employed as charge generation materials for use in laser printers using infrared exposure systems. Infrared sensitivity is desired for photoreceptors exposed to low-cost semiconductor laser diode light exposure devices. The absorption spectrum and photosensitivity of the phthalocyanines depend on the central metal atom of the compound. Many metal phthalocyanines have been reported and include, oxyvanadium phthalocyanine, chloroaluminum phthalocyanine, copper phthalocyanine, oxytitanium phthalocyanine, chlorogallium phthalocyanine, hydroxygallium phthalocyanine magnesium phthalocyanine and metal-free phthalocyanine. The phthalocyanines exist in many crystal forms, and have a strong influence on charge generation.

A photogenerating composition or pigment, that is, the charge generating functional material, may be present in the patterned binder composition in various amounts.

In embodiments, a charge transport layer may be employed. The charge transport layer may comprise a charge-transporting molecule, for example, a small molecule. The expression charge transporting "small molecule" refers to, for example, a monomer that allows the free charge photogenerated in the generator layer to be transported across the transport layer.

Any suitable charge transporting or electrically active small molecule may be employed as the charge transport material.

Typical charge transporting molecules include, for example, pyrene, carbazole, hydrazone, oxazole, oxadiazole, pyrazoline, arylamine, arylmethane, benzidine, thiazole, stilbene and butadiene compounds; pyrazolines such as 1-phenyl-3-(4'-diethylaminostyryl)-5-(4'-diethylamino phenyl) pyrazoline; diamines such as N,N'-diphenyl-N,N'-bis(3-methylphenyl)-(1,1'-biphenyl)-4,4'-diamine; hydrazones such as N-phenyl-N-methyl-3-(9-ethyl)carbazyl hydrazone and 4-diethyl amino benzaldehyde-1,2-diphenyl hydrazone; oxadiazoles such as 2,5-bis(4-N,N'-diethylaminophenyl)-1, 2,4-oxadiazole; poly-N-vinylcarbazole, poly-N-vinylcarbazole halide, polyvinyl pyrene, polyvinylanthracene, polyvinylacridine, a pyrene-formaldehyde resin, an ethylcarbazole-formaldehyde resin, a triphenylmethane polymer and polysilane, mixtures thereof, and the like.

In embodiments, to minimize or avoid cycle-up in machines with high throughput, the charge transport layer may be substantially free (for example, from zero to less than about two percent by weight of the charge transport layer) of triphenylmethane.

An exemplary small molecule charge transporting compound that permits injection of holes from the pigment into the charge generating layer with high efficiency and transports them across the charge transport layer with very short transit times is N,N'-diphenyl-N,N'-bis(3-methylphenyl)-(1, 1'-biphenyl)-4,4'-diamine. If desired, the charge transport material in the charge transport layer may comprise a polymeric charge transport material or a combination of a small molecule charge transport material and a polymeric charge transport material.

In embodiments, the charge transport layer may contain an active aromatic diamine molecule, which enables charge transport.

Generally, the thickness of the charge transport layer is from about 10 to about 100 micrometers, but a thickness outside this range can also be used. A charge transport layer should be an insulator to the extent that the electrostatic charge placed on the charge transport layer is not conducted in the absence of illumination at a rate sufficient to prevent formation and retention of an electrostatic latent image thereon. In general, the ratio of the thickness of a charge transport layer to the charge generation layers may be maintained from about 2:1 to 200:1, and in some instances as great as 400:1. Typically, a charge transport layer is substantially non-absorbing to visible light or radiation in the region of intended use but is electrically "active" in that it allows the injection of photogenerated holes from the photoconductive layer, that is, the charge generation layer, and allows these holes to be transported through itself to selectively discharge a surface charge on the surface of the active layer.

Additionally, adhesive layers may be provided, if necessary, between any of the layers in the photoreceptors to ensure adhesion of any adjacent layers. Alternatively, or in addition, adhesive material may be incorporated into one or both of the respective layers to be adhered. Such optional adhesive layers may have a thickness of about 0.001 micrometer to about 0.2 micrometer. Such an adhesive layer can be applied, for example, by dissolving adhesive material in an appropriate solvent, applying by hand, spraying, dip coating, draw bar coating, gravure coating, silk screening, air knife coating, vacuum deposition, chemical treatment, roll coating, wire wound rod coating, and the like, and drying to remove the solvent. Suitable adhesives include, but are not limited to, film-forming polymers, such as polyester, DuPont 49,000 (available from E. I. DuPont de Nemours & Co.), Vitel PE-100 (available from Goodyear Tire and Rubber Co.), polyvinyl butyral, polyvinyl pyrrolidone, polyurethane, polymethyl methacrylate, mixtures thereof and the like. In further embodiments, the adhesive layer may be a self-assembled patterned binder layer.

Optionally, an overcoat layer may also be utilized to improve resistance to abrasion. In some cases, an anti-curl back coating may be applied to the side opposite the photoreceptor to provide flatness and/or abrasion resistance where a web configuration photoreceptor is fabricated. These overcoating and anti-curl back coating layers are well known in the art and may comprise thermoplastic organic polymers or inorganic polymers that are electrically insulating or slightly semi-conductive. In embodiments, the overcoating and anti-curl back coating layers may be a self-assembled patterned binder layer. Overcoatings are continuous and may have a thickness of less than about 10 micrometers.

Optionally, an anti-curl backing layer may be employed to balance the total forces of the layer or layers on the opposite side of the supporting substrate layer. An example of an anti-curl backing layer is described in U.S. Pat. No. 4,654,284, the entire disclosure of which is incorporated herein by reference. A thickness between about 70 and about 160 micrometers is a satisfactory range for flexible photoreceptors.

EXAMPLES

Example 1

A patterned binder layer with highly ordered nano to micron-sized patterns, for example a layer with equispaced pores, is made using monocarboxy-terminated polystyrene in toluene. The patterned binder layer is made by coating, in a relative humidity of from about 50% and to about 90%, at temperatures of from about 20° C. to about 30° C., and at an air flow of from about 500 mm/s to about about 500 cm/s. The ordered films are demonstrated on a charge generation layer of a photoconductive imaging member. The pores in these patterned binder layers are filled with N,N'-diphenyl-N,N'-bis(3-hydroxyphenyl)-1,1'-biphenyl-4,4'-diamine, a hole transport material, thus creating columnar domains, such as nanowires or microwires, of high concentration hole transport materials.

Example 2

A patterned binder layer with highly ordered nano to micron-sized patterns, that is, a layer with equispaced pores, is made using monocarboxy-terminated polystyrene in toluene with 4,4'-(3,4-dimethylphenylazanediyl)bis(4,1-phenylene)dimethanol. The patterned binder layer is made by coating in relative humidity from about 50% and to about 90%, at temperatures of from about 20° C. to about 30° C., and in an air flow of from about 500 mm/s to about 500 cm/s. The patterned binder layer is made on a charge generation layer of a photoconductive imaging member. The pores in the patterned binder layer are filled with a solution having a polyol binder, for example DESMOPHEN 800, a melamine curing agent, for example, CYMEL 1130, and an acid catalyst, for example p-toluenesulfonic acid. The patterned binder layer is heated to a temperature of from about 110° C. to about 130° C., in order to cross-link the material in the pore, thus creating columnar domains of high strength material.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A photoreceptor device, comprising:
   a substrate, and
   at least one patterned binder layer comprising a solid binder matrix and hollow spaces filled with a functional material or a filler,
   wherein the solid binder matrix comprises a self-assembled binder material.

2. The photoreceptor device according to claim 1, wherein the binder material comprises a polymer selected from the group consisting of a block copolymer, a linear polymer and a branched polymer.

3. The photoreceptor device according to claim 2, wherein the block copolymer includes at least one block selected from the group consisting of a polystyrene, a poly(paraphenylene), a polyimide, poly2-vinylpyridine, poly(n-alkylmethacrylate), poly(n-butylmethacrylate), poly(methyl methacrylate), poly(2-vinylpyridine), polyisoprene, poly(ferrocenyldimethylsilane), poly(cyclohaylethylene), polylactide, poly(ferrocenyldimethylsilane), poly(dimethysiloxane), poly(ethylene-propylene), polyethylene, polybutadiene, poly(ethyleneoxide), polystyrenepolybutadiene, poly(α-methylstyrene), poly(4-hydroxystyrene), poly(methyltetraclododecene), poly(substituted-2-norbornene), poly(propyleneoxide), poly(butadienevinylpyridinium), poly(tert-butylacrylate), poly(cinnamoyl-ethylmethacrylate), pentadecyl phenol modified polystyrene, poly(4-vinylpyridine) and poly(tert-butylmethacrylate).

4. The photoreceptor device according to claim 2, wherein the polymer is capable of forming micelles.

5. The photoreceptor device according to claim 2, wherein the linear polymer is selected from the group consisting of monocarboxy terminated polystyrene, dicarboxy terminated polystyrene, polyamide, and mixtures thereof.

6. The photoreceptor device according to claim 1, wherein the binder material further comprises another functional material.

7. The photoreceptor device according to claim 6, wherein the other functional material is a charge generation material or a charge transport material.

8. The photoreceptor device according to claim 6, wherein the functional material and the another functional material are the same or similar materials.

9. The photoreceptor device according to claim 6, wherein the functional material and the another functional material are different.

10. The photoreceptor device according to claim 9, wherein the functional material comprises a charge generation material or a charge transport material, and the another functional material comprises the other of the charge generation material or the charge transport material.

11. The photoreceptor device according to claim 9, wherein the functional material comprises a first charge transport material, the other functional material comprises a second charge transport material, and wherein the first charge transport material and the second charge transport material are different.

12. The photoreceptor device according to claim 7, wherein the charge generation material comprises at least one material selected from the group consisting of quinacridones, dibromo anthanthrone pigments, perylene diamines, perinone diamines, polynuclear aromatic quinones, azo pigments, oxyvanadium phthalocyanine, chloroaluminum phthalocyanine, copper phthalocyanine, oxytitanium phthalocyanine, chlorogallium phthalocyanine, hydroxygallium phthalocyanine, magnesium phthalocyanine, metal-free phthalocyanine, and combinations thereof.

13. The photoreceptor device according to claim 7, wherein the charge transport material comprises a tertiary aromatic amine selected from the group consisting of N,N'- diphenyl-N,N'-bis(3-hydroxyphenyl)-1,1'-biphenyl-4,4'-diamine, N,N'-diphenyl-N,N'-bis(3-methylphenyl)-1,1'-biphenyl-4,4'-diamine, N,N,N'N'-tetra(4-methylphenyl)-(1,1'-biphenyl)-4,4'-diamine, 4,4'-(3,4-dimethylphenylazanediyl) bis(4,1-phenylene)dimethanol, N,N'-Bis(3-methylphenyl)-N,N'-bis(4-n-butylphenyl)-1,1'-terphenyl-4,4-diamine, and combinations thereof.

14. The photoreceptor device according to claim 1, wherein the hollow spaces are pores, holes, spheres, ridges or channels having a diameter of from about 10 nm to about 100 µm.

15. The photoreceptor device according to claim 1, wherein the functional material of the hollow spaces comprises a charge generation material or a charge transport material.

16. The photoreceptor device according to claim 15, wherein the charge generation material comprises at least one material selected from the group consisting of quinacridones, dibromo anthanthrone pigments, perylene diamines, perinone diamines, polynuclear aromatic quinones, azo pigments, oxyvanadium phthalocyanine, chloroaluminum phthalocyanine, copper phthalocyanine, oxytitanium phthalocyanine, chlorogallium phthalocyanine, hydroxygallium phthalocyanine, magnesium phthalocyanine, metal-free phthalocyanine, and combinations thereof.

17. The photoreceptor device according to claim 15, wherein the charge transport material comprises a tertiary aromatic amine selected from the group consisting of N,N'-diphenyl-N,N'-bis(3-hydroxyphenyl)-1,1'-biphenyl-4,4'-diamine, N,N'-diphenyl-N,N'-bis(3-methylphenyl)-1,1'-biphenyl-4,4'-diamine, N,N,N'N'-tetra(4-methylphenyl)-(1,1'-biphenyl)-4,4'-diamine, 4,4'-(3,4-dimethylphenylazanediyl) bis(4,1-phenylene)dimethanol, N,N'-Bis(3-methylphenyl)-N,N'-bis(4-n-butylphenyl)-1,1'-terphenyl-4,4-diamine, and combinations thereof.

18. The photoreceptor device according to claim 1, wherein the patterned binder layer is selected from the group consisting of an undercoat layer, a charge transport layer, a charge generation layer, a charge transport and charge generation layer, and an overcoat layer.

19. A xerographic device including the photoreceptor device according to claim 1.

20. A photoreceptor device, comprising:
a substrate;
and at least one of a charge generation layer, a charge transport layer, and an overcoat layer;
wherein any of the at least one of the charge generation layer, the charge transport layer, and the overcoat layer includes a self-assembled patterned binder layer comprising a solid binder matrix and hollow spaces filled with a functional material or a filler.

21. The photoreceptor device according to claim 20, wherein the at least one of the charge generation layer, the charge transport layer, and the overcoat layer optionally includes a functional material.

22. The photoreceptor device according to claim 20, wherein the charge generation layer includes the self-assembled patterned binder layer, and
wherein a charge generation functional material is inside hollow spaces of the charge generation layer or within a binder material portion of charge generation layer.

23. The photoreceptor device according to claim 22, wherein the self-assembled binder layer further comprises charge transport functional materials.

24. The photoreceptor device according to claim 22, wherein the charge generation functional materials are inside the hollow spaces, and the charge transport functional materials are in the binder material portion of the self-assembled patterned binder layer.

25. The photoreceptor device according to claim 22, wherein the charge generation functional materials are in the binder material portion of the self-assembled patterned binder layer, and the charge transport functional materials are inside the hollow spaces.

26. The photoreceptor device according to claim 22, wherein the charge generation functional materials are selected from quinacridones, dibromo anthanthrone pigments, perylene diamines, perinone diamines, polynuclear aromatic quinones, azo pigments, oxyvanadium phthalocyanine, chloroaluminum phthalocyanine, copper phthalocyanine, oxytitanium phthalocyanine, chlorogallium phthalocyanine, hydroxygallium phthalocyanine magnesium phthalocyanine, metal-free phthalocyanine, and combination thereof.

27. A photoreceptor device, comprising:
a substrate;
and at least one of a charge generation layer, a charge transport layer, and an overcoat layer;
wherein the charge transport layer is a self-assembled binder layer having a charge transport functional material, and
wherein the charge transport functional material is inside hollow spaces of the self-assembled patterned binder layer or within a solid binder matrix of the self-assembled patterned binder layer.

* * * * *